United States Patent [19]
Yee

[11] Patent Number: 5,967,932
[45] Date of Patent: Oct. 19, 1999

[54] STRUCTURE FOR CONNECTING DIFFERENTIAL MECHANISM AND OUTPUT SHAFT

[75] Inventor: Su-Yeoul Yee, Kyungsangnam-do, Rep. of Korea

[73] Assignee: Hyundai Motor Company, Seoul, Rep. of Korea

[21] Appl. No.: 08/992,780

[22] Filed: Dec. 17, 1997

[30] Foreign Application Priority Data

Dec. 19, 1996 [KR] Rep. of Korea ................ 96-67726

[51] Int. Cl.[6] .................................................. F16H 48/06
[52] U.S. Cl. ........................ 475/230; 475/220; 403/328
[58] Field of Search ............................. 475/230, 220; 403/328

[56] References Cited

U.S. PATENT DOCUMENTS

| | | | |
|---|---|---|---|
| 3,593,595 | 7/1971 | Taylor | 475/230 |
| 4,630,506 | 12/1986 | Allmandinger et al. | 475/230 |
| 5,131,894 | 7/1992 | Hilker | 475/230 |
| 5,390,571 | 2/1995 | Fox, III et al. | 403/328 X |

*Primary Examiner*—Charles A. Marmor
*Assistant Examiner*—Tisha D. Waddell
*Attorney, Agent, or Firm*—Birch, Stewart, Kolasch & Birch, LLP.

[57] ABSTRACT

A differential mechanism and output shaft connecting structure wherein an output shaft is tightly assembled to a side gear for preventing an oil seal for sealing a gap between a transmission housing and for preventing an output shaft from becoming damaged while the output shaft is being inserted into the side gear. The apparatus for connecting the differential mechanism and the output shaft includes a side gear of the differential mechanism, an output shaft designed to be splined to the side gear, and a connecting unit which serves to assemble the side gear and the output shaft by bringing one end of the output shaft into contact with the rotating shaft of a pinion gear when the output shaft is inserted into the side gear.

4 Claims, 2 Drawing Sheets

STRUCTURE FOR CONNECTING DIFFERENTIAL MECHANISM AND OUTPUT SHAFT

BACKGROUND OF THE INVENTION

1. Field of the Invention

The present invention relates to a differential assembly for automotive vehicles, and more particularly to an apparatus for connecting a differential assembly and an output shaft for automotive vehicles.

2. Description of the Prior Art

Generally, there are many known differential mechanisms in the prior art which are used to compensate for the slipping of one of the drive wheels of a pair of drive wheels of a vehicle.

The differential assembly, as shown in FIG. 3, comprises a ring gear 51 connected with a transmission (T) and fixed to a housing 50, a pinion gear 53 for meshing with a rotating shaft 52 within the housing 50, a side gear 54 engaged with the pinion gear 53, and an output shaft 56 inserted at one end thereof into the side gear 54 and mounted thereon with a joint 55 by suitable splines disposed therebetween (not shown).

Meanwhile, there is provided with an oil sealing member 57 between the housing 50 and the output shaft 56 to seal the differential assembly.

During normal operation a ring gear 51 is rotated by the torque output from the transmission (T), and the output shaft 56 rotates with the pinion gear 53 and the side gear 54 meshed in engagemt with the ring gear 51.

At this location, the side gear 54 and the output shaft 56 are interlinked by suitable splines. The side gear 54 and the output shaft 56 as shown in FIG. 4, are connected through a groove 58 formed on one end of the output shaft 56. A clip 59 is inserted within the groove 58 and elastically, protrudingly mounted within the output shaft groove 58, and a recess 60 formed on the side gear 54 for receiving the peripheral portion of the clip 59 when being mounted in the groove 58.

That is to say, the side gear 54 and the output shaft 56 are assembled together while the clip 59 is retained in the groove 58 provided in the output shaft 56. Thereafter the clip 59 is extended in a peripheral direction thereof by its elastic force and is partly received into the recess 60, thereby preventing the side gear 54 from being separated from the output shaft 56.

However, there is a problem in such a structure for connecting the side gear and the output shaft according to the prior art thus constructed, in that when the output shaft and the side gear are assembled while the clip is engaged within the groove contained in the output shaft, the exposed portion of the clip extending out of the groove causes the oil seal to become damaged which passing through the housing of the transmission.

There is another problem in that the output shaft becomes separated from the side gear when the clip, due to wear and tear shrinks within the groove contained in the output shaft in response to a drop in its elastic force.

SUMMARY OF THE INVENTION

Accordingly, the present invention is provided to solve the aforementioned problems and accordingly it is an object of the present invention to provide a differential mechanism and output shaft connecting structure by which an output shaft is tightly assembled to a side gear, while at the same time preventing an oil seal, which seals a gap between the transmission housing and the output shaft from being damaged while the output shaft is inserted into the side gear.

In accordance with the object of the present invention, there is provided an apparatus for connecting the differential mechanism and the output shaft, the apparatus comprising an output shaft engaged with a side gear, and a connecting unit for assembling the side gear and the output shaft whereby one end of the output shaft is brought into contact with a rotating shaft of a pinion gear when the output shaft is inserted into the side gear.

BRIEF DESCRIPTION OF THE DRAWINGS

For a fuller understanding of the nature and object of the present invention, reference should be made to the following detailed description taken in conjunction with the accompanying drawings, in which.

DETAILED DESCRIPTION OF THE PREFERRED EMBODIMENT

Figure 1:
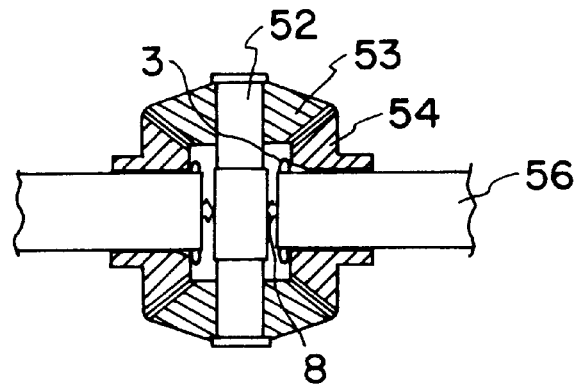
FIG. 1 is a sectional view for illustrating a connecting structure for assembling a differential mechanism and an output shaft according to the present invention.

The preferred embodiment of the present invention will now be described in detail with reference to the accompanying drawings.

Throughout the drawings, like reference numerals and nomenclature are used for designation of like or equivalent parts or portion for simplicity of illustration and explanation, a detailed description of which will be omitted.

Figure 2:
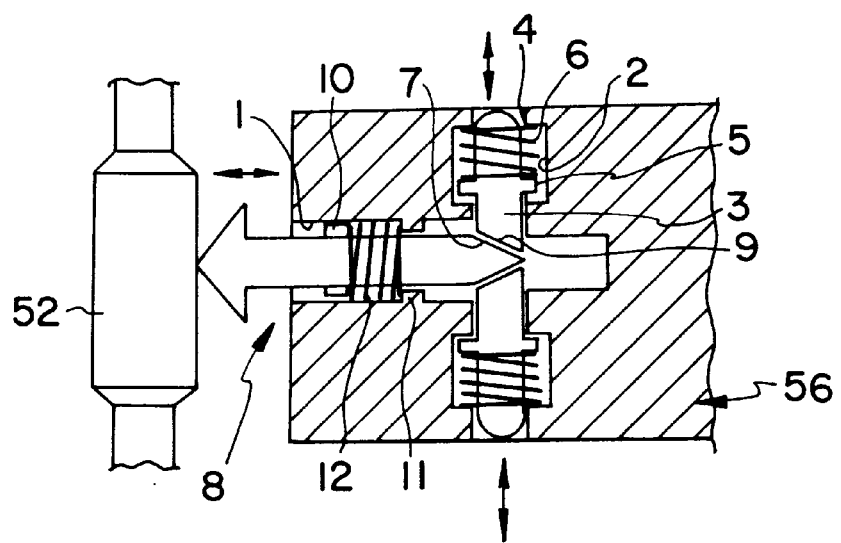
FIG. 2 is an enlarged sectional view for illustrating a main part of the present invention.
Figure 3:
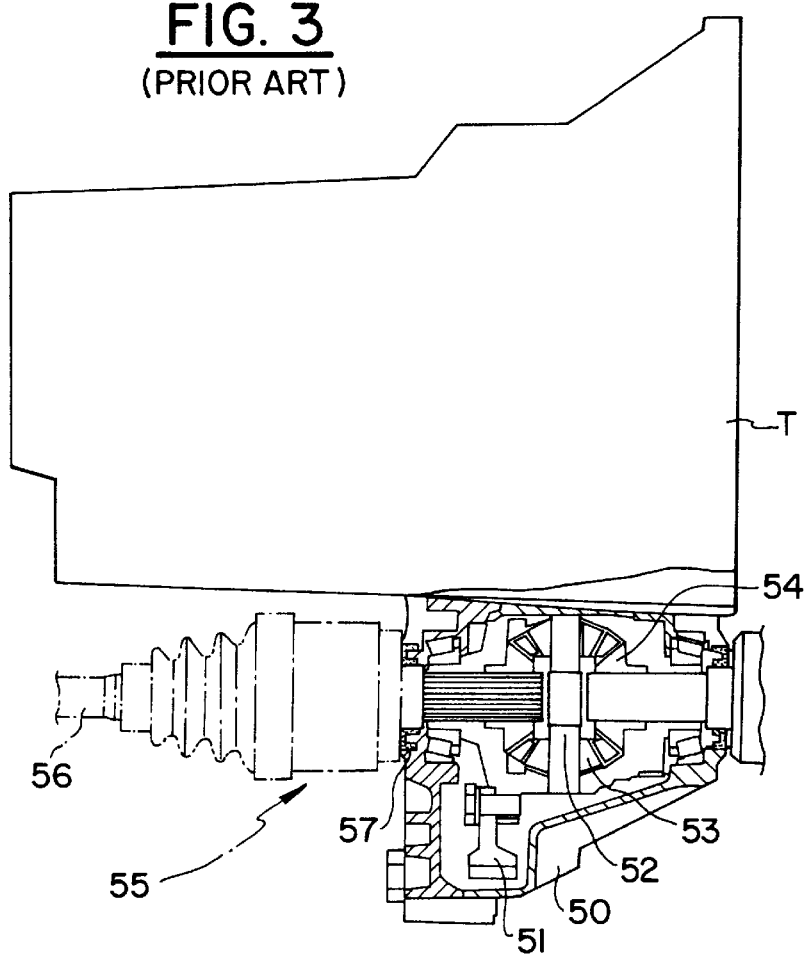
FIG. 3 is a sectional view for illustrating an engaged state of the differential mechanism and a transmission according to the prior art.
Figure 4:
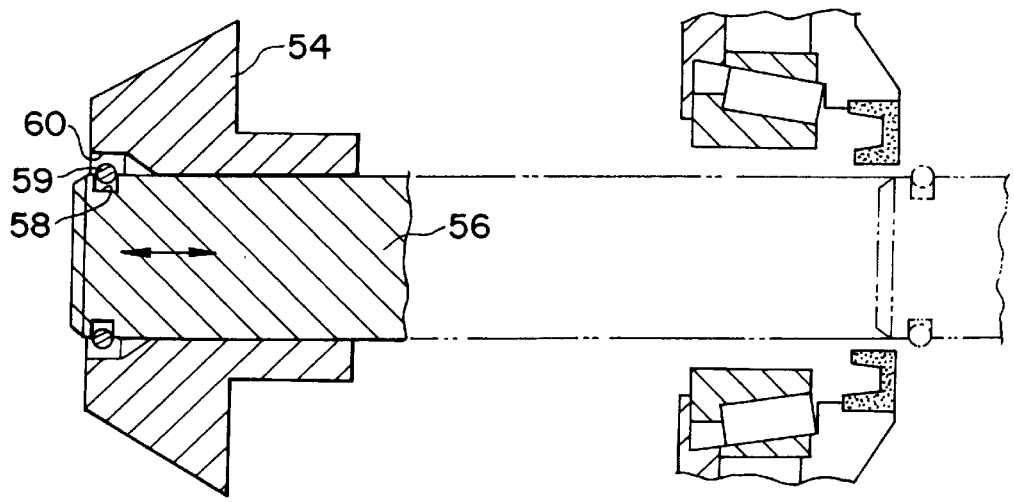
FIG. 4 is a sectional view for illustrting an assembled state of the side gear and the output shaft according to the prior art.

As shown in FIGS. 1 and 2, a connecting unit is arranged between the differential mechanism and the output shaft 56, and allows the side gear 54 and the output shaft 56 to be assembled by bringing one end contained in the output shaft 56 into contact with the the rotating shaft 52 of the pinion gear when the output shaft 56 is inserted into the side gear 54.

The connecting unit includes a first hole 1 having a predetermined depth from one end of the output shaft 56 and formed in a direction that the output shaft 56 is inserted into the side gear 54; a second hole 2 disposed at a right angle to the first hole 1; an anchor pin 3 inserted into the second hole 2 for limited vertical movement thereof; a straining unit provided within the second hole 2 for pushing the anchor pin 3 toward the inner side of the second hole 2; and a driving unit for pushing the anchor pin 3 out of the second hole 2 when the output shaft 56 is inserted into the side gear 54 and comes into close contact with the rotating shaft of the pinion gear.

When the output shaft 56 is inserted into the side gear 54, the driving unit comes into closed contact with the rotating shaft 52 of the pinion gear 54 and causes the anchor pin 3 to protrude out of the second hole by pushing it out of the second hole 2, thereby allowing the the anchor pin 3 to be received within the recess 60 to fix the output shaft 56 thereto.

The straining unit has a tripping member 4 which protrudes at a predetermined height on an upper side of the second hole 2; and a spring 6 supported at one end thereof by a stopper 5 protrudingly formed on an outer circumferential side of the anchor pin 3, and at the other end thereof by the tripping member 4, to thereby push it toward the center of the second hole 2.

Furthermore, the driving unit includes a bar 8 formed at one end thereof with a tapered portion 7 which extends into the first hole 1 for contact with the anchor pin 3, and at the same time, protrudes at the other end thereof out of the first hole 1 to contact the rotating shaft 52 of the pinion gear. A sloping portion 9 formed at the end of the anchor pin 3 contacts with the tapered portion 7 whereby the anchor pin 3 slides out of the second hole 2 when the bar 8 pushes the tapered portion 7. An an elastic unit is provided within the first hole 1 to push the bar out of the first hole 1.

That is, the anchor pin 3 is designed to remain within the second hole 2 while the output shaft 56 is being inserted into side gear 54, thereby preventing the oil seal 57 from being damaged. The anchor pin 3 protrudes out of the second hole 2 to be retained within the recess 60 after the output shaft 56 is inserted into the side gear 54, thereby retaining the output shaft 56 against axial separation relative to the differential housing 50.

The elastic unit includes a bar protruder 10 formed on the circumferential surface of the bar 8, a hole protruder 11 formed at a distance from the bar protruder 10 on the inner surface of the first hole 1, and a first spring 12 for pushing the bar 8 out of the first hole 1.

Now, the operation of the differential mechanism and output shaft connecting structure thus constructed will be described.

The anchor pin 3 is biased toward the inner side of the second hole 2 by the spring 6 to be entirely received within the second hole 2. In such a state that the anchor pin 3 does not protrude out of the second hole 2, the anchor pin 3 is positioned so as not to contact with the oil seal 57 while the output shaft 56 is being inserted into the side gear 54.

At this location, the bar 8 protrudes out of the first hole 1 until the output shaft 56 is inserted into the side gear 54. When the output shaft 56 is assembled to the side gear 54, the bar 8 comes into contact with the rotating shaft 52 so that the bar 8 presses the spring 12 toward the inner side of the first hole 1, thereby moving backward.

The backward motion of the bar 8 toward the inner side of the first hole 1 causes the tapered portion 7 of the bar to slide into the gap formed between the sloping portions 9 of the anchor pins 3, thereby allowing the anchor pin 3 to protrude from the second hole 2.

When the bar 8 is entirely received within the first hole 1, the anchor pin 3 protrudes out of the second hole 2 and is inserted within the recess 60 of the side gear 54. In other words, the output shaft 56 is then axially displaced to the left to cause one side of the anchor pin 3 to be contained within the recess 60, thereby preventing the output shaft 56 from being separated from the side gear 54 connected thereto.

In order to separate the output shaft 56 from the side gear 54, the exposed portion of the anchor pin 3 is pressed by a worker, the anchor pin 3 is then displaced to the inner side of the second hole 2 to cause the bar 8 to move toward the rotating shaft 52 of the pinion gear. That is to say, the anchor pin 3 is entirely received within the second hole 2 to cause the output shaft 56 to be smoothly separated from the side gear 54.

At this location, the bar 8 is partially exposed by the elastic force of the spring 12 but does not bolt out of the first hole 1.

As apparent from the foregoing, there is an advantage in the differential mechanism and output shaft connecting structure thus constructed in that as the side gear and output shaft are assembled together, the anchor pin is entirely received within the second hole to thereby prevent the oil seal from being damaged.

What is claimed is:

1. An apparatus for connecting a differential mechanism and an output shaft, the apparatus comprising:

a side gear of a differential mechanism;

an output shaft designed to be splined to the side gear; and a connecting unit for serving to assemble the side gear and the output shaft by bringing one end of the output shaft into contact with a shaft of a pinion gear when the output shaft is inserted into the side gear, said connecting unit including a first hole having a predetermined depth designed at one end of the output shaft and formed in a direction whereby the output shaft is inserted into the side gear;

a second hole communicating at a right angle to the first hole;

an anchor pin slidably disposed within the second hole for limited vertical movement thereon;

a restraining unit provided within the second hole for biasing the anchor pin toward the inner side of the second hole; and a driving unit for pushing the anchor pin out of the second hole when the output shaft is inserted into the side gear and comes into closed contact with the shaft of the pinion gear.

2. The apparatus as defined in claim 1, wherein the restraining unit comprises a tripping member protruding at a predetermined height on an upper side of the second hole; and a first spring supported at one end thereof by a stopper, protrudingly formed on an outer circumferential side of the anchor pin, and at the other end thereof by the tripping member, to thereby push it toward the inner side of the second hole.

3. The apparatus as defined in claim 1, wherein the driving unit comprises:

a bar formed at one end thereof with a tapered portion being inserted into the first hole to bring it into contact with the anchor pin, the bar protruding at the other end thereof, out of the first hole, to come into contact with the shaft of the pinion gear;

a sloping portion formed at the end of the anchor pin for engaging the tapered portion so that the anchor pin slides out of the second hole when the bar pushes the tapered position; and an elastic unit provided within the first hole to push the bar out of the first hole.

4. The apparatus as defined in claim 3, wherein the elastic unit comprises:

a bar protruder formed on the circumferential surface of the bar;

a hole protruder formed at a distance from the bar protruder on the inner surface of the first hole, and a second spring for pushing the bar out of the first hole.

* * * * *